Figure 1:
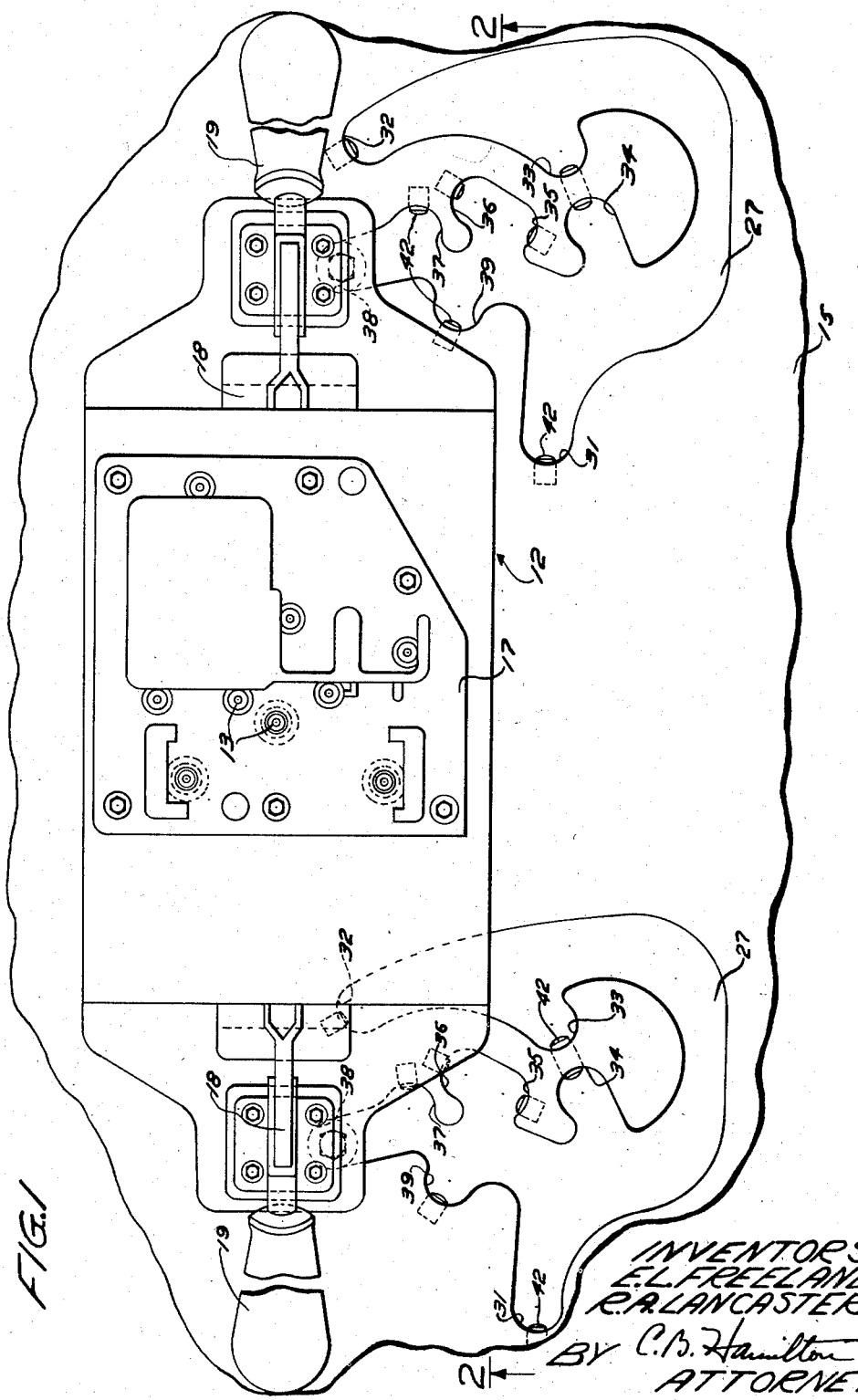

INVENTORS
E.L.FREELAND
R.A.LANCASTER
BY C.B.Hamilton
ATTORNEY

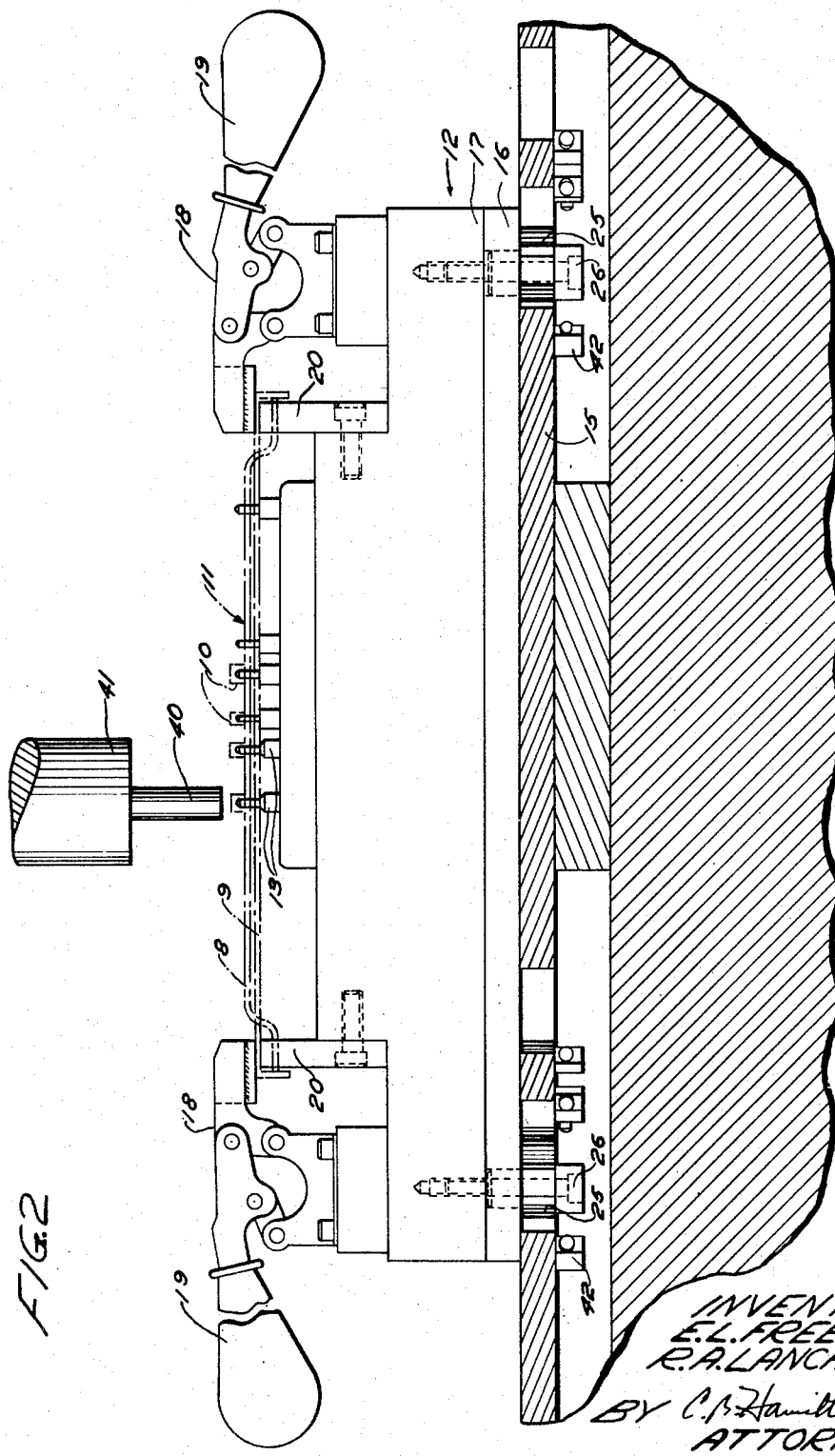

United States Patent Office 2,801,555
Patented Aug. 6, 1957

2,801,555

WORK-LOCATING APPARATUS

Everett L. Freeland and Robert A. Lancaster, Indianapolis, Ind., assignors to Western Electric Company, Incorporated, New York, N. Y., a corporation of New York Application May 16, 1955, Serial No. 508,595

5 Claims. (Cl. 78—48)

This invention relates to work-locating apparatus, and more particularly to apparatus for sequentially locating a plurality of rivets in an article in a position for riveting.

An object of the invention is to provide new and improved apparatus for locating work sequentially in a plurality of positions relative to a fixed tool.

Another object of the invention is to provide apparatus for locating an article carrying rivets sequentially in a position for riveting.

A further object of the invention is to provide a workholder slidable to several positions under a riveting tool and operable to actuate the tool in each position.

In a work-locating apparatus illustrating certain features of the invention, there may be provided a workholder slidable over a support positioned below a riveting tool and having a pair of actuators projecting into guide openings in the support and serving to actuate pairs of switches when in selected positions to actuate the riveting tool.

A complete understanding of the invention may be obtained from the following detailed description of a worklocating apparatus forming a specific embodiment thereof, when read in conjunction with the appended drawings, in which:

Fig. 1 is a fragmentary top plan view of an apparatus forming one embodiment of the invention, and Fig. 2 is a vertical section taken along line 2—2 of Fig. 1.

Referring now in detail to the drawings, there is shown therein an apparatus for riveting rivets 10 of plates 8 and 9 of a base 11 of a telephone key set, or the like, and includes an anvil or work-holder 12 having anvil tools 13 spaced in predetermined positions on the anvil, which is slidable on a table or support 15. The anvil includes a slide plate 16 and a body 17 carrying toggle-joint linkage clamps 18 having handles 19 operable to force the clamps 18 toward stationary jaws 20 for clamping the plate 9 to the anvil in a properly oriented position thereon.

The work-holder 12 carries a pair of guides or collars 25 on actuating rods 26 projecting through slots 27 in the plate 15 and of identical patterns or configurations. The collars are adapted to fit simultaneously into each pair of notches or sockets 31, 32, 33, 34, 35, 36, 37, 38 and 39 to locate each anvil tool 13 directly below a heading or riveting tool 40 reciprocable toward and away from the anvil by a suitably driven ram 41. As the collars seat in each pair of sockets, a pair of electrical switches 42 in series with one another and the actuating mechanism for the ram 41 are engaged and closed by the rods 26 to cause the actuating mechanism to move the tool 40 into operable engagement with the rivets 10 and then retract the tool. The anvil is slid manually by the handles 19 from riveting position to riveting position, and the notches and collars precisely locate each anvil tool 13 below the tool 40, and the rods 26 actuate the tool 40 each time the anvil locates one of the tools 13 directly below the tool 40. While each pair of switches 42 at one of the pairs of notches is connected in series with one another, each such pair of the switches 42 is connected in parallel with each other pair of the switches 42 so that the actuating mechanism is actuated when each of the anvil tools 13 is properly located.

The above-described apparatus precisely locates the tools 13 sequentially in riveting position and automatically actuates the tool 40. However, an operator must have a hand on each of the handles 19 so that the hands are kept away from the tool 40 during its operation. The apparatus is quick in its operation, and is simple and inexpensive in construction.

While the above-described embodiment includes a single power-driven tool and a multitool anvil, it is obvious that the invention includes apparatus of a type having several spaced power driven tools and only a single part held by the anvil which would serve to precisely locate the part sequentially below each power driven tool.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A work-locating apparatus, which comprises a support having a pair of slots therein of a predetermined pattern having pairs of notches, a work-holder slidable on the support and having a pair of projections fitting loosely in the slots and closely in the notches, tool means movable toward and away from the support, and pairs of interdependent actuators having portions extending into position to be operated by the projections when the projections enter each pair of notches for actuating said tool means.

2. In a work-locating apparatus, a table top having a pair of spaced identical slots therein having pairs of notches, the two notches of each pair facing in the same direction and being spaced apart the same predetermined distance as the notches of each other pair, a plurality of pairs of switches positioned at the notches, a work-holder slidable on the table top, a pair of guides fixed to the bottom of the work-holder in positions spaced part said distance and designed to fit closely into the notches, and tool means movable relative to the table top by simultaneous actuation of each pair of switches.

3. In a work-locating apparatus, a table top having a pair of spaced identical slots therein having pairs of notches, the two notches of each pair facing in the same direction and being spaced apart the same predetermined distance as the notches of each other pair, a plurality of pairs of switches positioned at the notches, a workholder slidable on the table top, a pair of guides fixed to the bottom of the work-holder in positions spaced apart said distance and designed to fit closely into the notches, tool means movable relative to the table top by simultaneous actuation of each pair of switches, and clamping means having clamp-actuating handles projecting from opposite sides of the work-holder by which the workholder may be moved on the table top.

4. In an article-working apparatus, a tool reciprocable along a fixed vertical axis, a supporting plate positioned below the tool and having therein a pair of guide slots having pairs of notches and identical in configuration and spaced apart in positions in which the notches of each pair face in the same direction as one another and are spaced apart the same distance as each other pair of notches, a work-holder slidable on the plate, a pair of rods fixed to and projecting downwardly from the workholder into and through the plate for entering the pairs of notches to locate the work-holder relative to the tool, and a plurality of pairs of actuating switches for actuating said tool when operated in pairs mounted on the bottom of the plate in positions such that the switches are actuated by the rods only when the rods are in the notches.

5. In an article-working apparatus, a tool reciprocable along a fixed vertical axis, a supporting plate positioned below the tool and having therein a pair of guide slots having pairs of notches and identical in configuration and spaced apart in positions in which the notches of each pair face in the same direction as one another and are spaced apart the same distance as each other pair of notches, a work-holder slidable on the plate, a pair of rods fixed to and projecting downwardly from the work-holder into and through the plate for entering the pairs of notches to locate the work-holder relative to the tool, a pair of clamps positioned on the work-holder and having handles projecting from opposite sides of the work-holder, and a plurality of pairs of actuating switches mounted on the bottom of the plate in positions such that the switches are actuated by the rods only when the rods are in the notches and said switches being operative to actuate said tool when a pair of them are operated simultaneously.

References Cited in the file of this patent
UNITED STATES PATENTS

| | | |
|---|---|---|
| 1,010,657 | Mason | Dec. 5, 1911 |
| 2,268,654 | Goddu | Jan. 6, 1942 |
| 2,707,419 | Schron | May 3, 1955 |